United States Patent [19]

Engstrom et al.

[11] Patent Number: 4,611,406
[45] Date of Patent: Sep. 16, 1986

[54] ENCLOSURE FOR ELECTRICAL DATA INPUT APPARATUS

[75] Inventors: Keith A. Engstrom, So. Barrington; Bjarne Frederiksen, Melrose Park, both of Ill.

[73] Assignee: Illinois Tool Works Inc., Chicago, Ill.

[21] Appl. No.: 615,864

[22] Filed: May 31, 1984

[51] Int. Cl.$^4$ .............................................. B43L 13/00
[52] U.S. Cl. ......................................... 33/443; 33/430
[58] Field of Search ........................... 33/430, 443–446

[56] References Cited

U.S. PATENT DOCUMENTS

| 117,964 | 8/1871 | Baade | 33/443 |
|---|---|---|---|
| 2,194,889 | 3/1940 | De Lisle | 33/443 |
| 2,424,630 | 7/1947 | Perez | 33/443 |
| 4,010,547 | 3/1977 | Kaitatzidis | 33/443 |

*Primary Examiner*—Richard R. Stearns
*Attorney, Agent, or Firm*—Donald D. Mondul; Thomas W. Buckman

[57] ABSTRACT

An enclosure for an electrical data input apparatus which is formed of a top section and a bottom section to form a case. The case has a top section which provides operational access to the electrical data input apparatus, such as a graphics tablet input device, with additional accesses for switching functions, amenable both to right-hand and left-hand use by an operator. The switching function accesses are distinguished one from another by different access hole shapes in order that appropriate switching functions may be effected via those switching function accesses without the necessity of looking away from the computer display and thereby breaking the attention of the operator. Further ergonomic provisions of this enclosure are a stylus which is removably storable within the case, elevation adjustment means by which an operator may adjust the angular attitude of the case with respect to a work surface, and a scribing alignment means which cooperates with scribing guide means in the upper face of the case to enable an operator to record substantially geometrically true inputs on the graphic tablet input device. The scribing alignment means is also removably storable within the case. A further feature of the device is the provision of gripping means on the underside of the case to facilitate hand held operation of the graphic input tablet by an operator.

1 Claim, 7 Drawing Figures

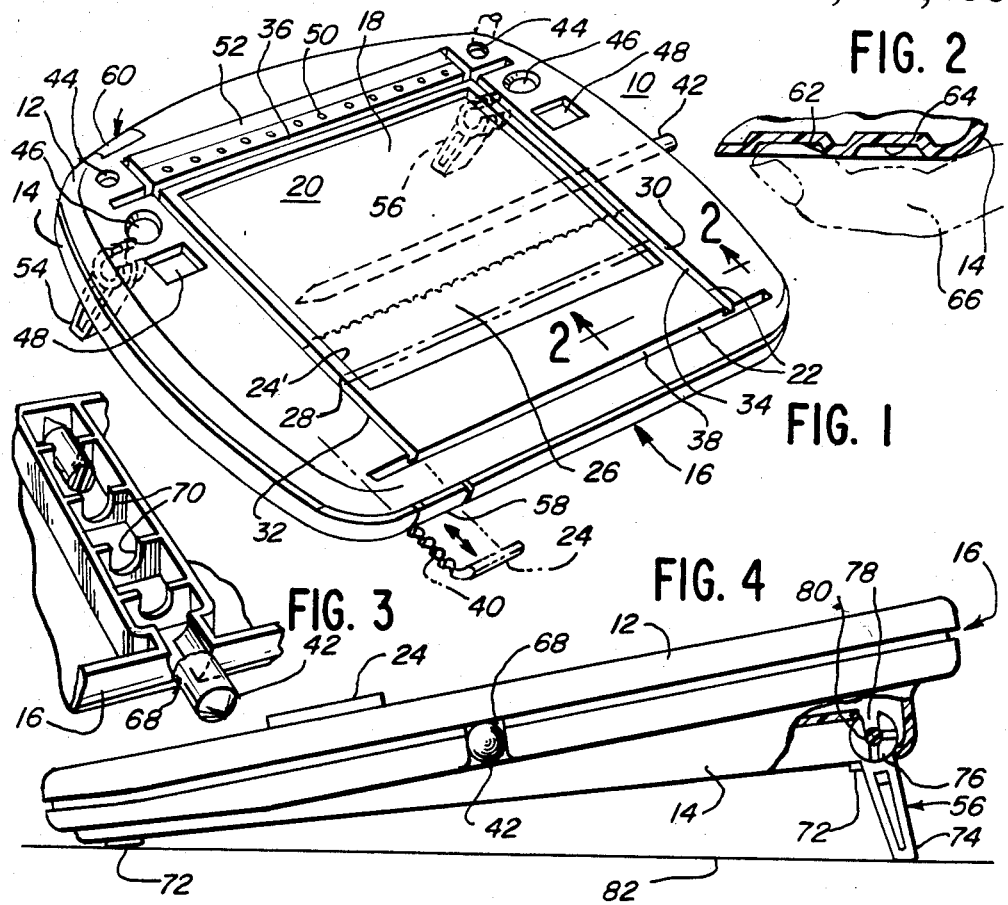
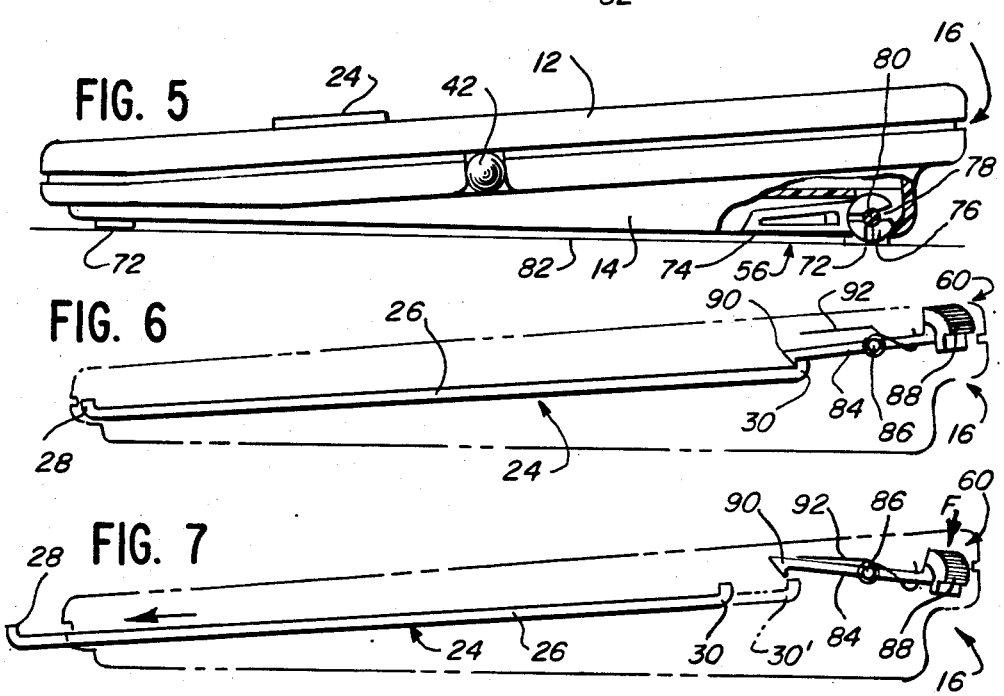

ENCLOSURE FOR ELECTRICAL DATA INPUT APPARATUS

BACKGROUND OF THE INVENTION

The present invention is directed to an enclosure for an electrical data input apparatus which promotes efficient and precise use of that apparatus in facilitating the human operator-to-computer interface. Numerous devices have recently been developed to facilitate the human operator-to-computer interface in order that communication with a computer by human operator can be as straightforward as possible. Among those new input devices is the graphics tablet input device which enables direct input of a single position or a series of a multiplicity of positions in a two dimensional coordinate space in a language understandable by a computer and reproducible by a computer on a display device, such as a cathode ray tube (CRT). This invention addresses an enclosure for such a graphic tablet input device which is designed to further enhance the transparency of the interface between human operator and computer as well as to promote greater precision of input via the graphics tablet, all presented in an ergonomically pleasing and convenient enclosure.

SUMMARY OF THE INVENTION

The invention is an enclosure for an electrical data input apparatus such as a graphics tablet input device, which enclosure is formed of a top section and a bottom section to form a case. The case has a top section which provides operational access to the graphics tablet input device with additional accesses for switching functions, amenable both to right-hand and left-hand use by a human operator. The switching function accesses are distinguished one from another by different access hole shapes in order that appropriate switching functions may be effected via those switching function accesses without the necessity of looking away from a computer display and thereby breaking the attention of the human operator.

Further ergonomic provisions of this invention are a recordation means such as a passive stylus which is removably storable within the case, elevation adjustment means by which a human operator may adjust the angular attitude of the case with respect to a work surface, and a scribing alignment means which cooperates with scribing guide means in the upper face of the case to enable a human operator to record substantially geometrically true inputs, such as straight lines, rectangles, or the like, on the graphic tablet input device. The scribing alignment means is also removably storable within the case.

A further feature of the present invention is the provision of gripping means on the underside of the case to facilitate hand held operation of the graphic input tablet by a human operator.

DETAILED DESCRIPTION OF THE DRAWINGS

FIG. 1 is a perspective drawing of the preferred embodiment of the present invention illustrating the elevation adjustment means, the storage of the recordation means, and the storage and utilization of the scribing alignment means in phantom.

FIG. 2 is a partial section taken along line 2—2 of FIG. 1 illustrating the grip facilitating means of the preferred embodiment of the invention.

FIG. 3 is a perspective broken away detail view of the storage cavity for the recordation means of the preferred embodiment of the invention.

FIG. 4 is a side view of the preferred embodiment of the invention with detail of the attachment of the elevation adjustment means shown in partial section.

FIG. 5 is a side view of the preferred embodiment of the present invention, similar to the view of FIG. 4, showing the elevation adjustment means in partial section in its stowed position.

FIG. 6 is a detailed side view of the scribing alignment means in its stored position with the case of the present invention shown in phantom.

FIG. 7 is a view of the scribing alignment means, illustrating its release by the associated latching means, with the case of the present invention shown in phantom.

DETAILED DESCRIPTION OF THE INVENTION

Referring to FIG. 1, an enclosure 10 comprising a top section 12 and a bottom section 14 assemblable to form a case 16 provides in the top section 12 an operational access 18 to a graphic tablet input device 20. Also provided in the top section 12 are scribing guide means 22 adjacent the operational access 18. Associated with the enclosure 10 and removably storable within the case 16 as shall be discussed in greater detail hereinafter, is a scribing alignment means 24, shown in FIG. 1 partially inserted in its stored position and in phantom as reference numeral 24' in a representative operational location.

The scribing alignment means 24 is comprised of an elongated central portion 26, as shown best in FIGS. 6 and 7, and legs 28 and 30 depending from each end of the elongated central portion 26 and substantially perpendicular thereto. In operation, the scribing alignment means 24 cooperates with the scribing guide means 22 in a first orientation with respect to the operational access 18 by sliding engagement of leg 28 with slot 32 and sliding engagement of leg 30 with slot 34. This is the orientation depicted in FIG. 1 in phantom. Similarly, the scribing alignment means 24 could cooperate with the scribing guide means 22 in an orientation substantially perpendicular to the above-described first orientation with respect to the operational access 18 by sliding engagement of leg 28 with slot 36 and sliding engagement of leg 30 with slot 38. The scribing alignment means 24 further includes lateral guide means 40 in the form of a plurality of grooves along one side of the elongated central portion 26. In this manner a stylus such as 42 could be engaged within one of the grooves of the lateral guide means 40 as the scribing alignment means 24 slides along cooperatively with the scribing guide means 22 to effect inscribing of a straight line on the graphic tablet input device 20 through the operational access 18.

The stylus 42 is shown in FIG. 1 in phantom in its stowed position, which stowed position will be described more fully hereinafter.

Also illustrated in FIG. 1 are stylus rest means 44 in the form of right and left cavities in the top section 12 of the case 16 in which the stylus 42 can be rested when not in use and not stowed.

Further illustrated in FIG. 1 are switching access means 46 and 48. Switching access means 46 and 48 are located in the top section 12 of the case 16 on two sides of operational access 18 in order to facilitate either right or left-hand operation by an operator. Further, switching access means 46 is differently shaped than switching access means 48 in order that an operator can determine which switching access is being engaged by him merely by touch so that the operator's attention upon a computer display device (not shown) need not be diverted in order to ascertain which switching access means 46, 48 is being engaged. Additional switching function accesses 50 are included in the preferred embodiment of the invention as well as a switching function label means 52 by which individual switching function accesses 50 may be identified.

Elevation adjustment means 54 and 56 are rotatably attached to the bottom section 14 of the case 16 and provide angular adjustment of the case 16 with respect to a work surface as shall be hereinafter described in greater detail. Stowage of the scribing alignment means 24 is provided within a cavity 58 in the case 16. The scribing alignment means 24 is retained within the cavity 58 by a latch 60 in a manner which shall be described in greater detail hereinafter.

For ease of understanding the invention disclosed herein like elements appearing in various figures will be referred to by the same reference numerals.

Referring now to FIG. 2, a detailed section view of a portion of the bottom section 14 is shown. Molded into a portion of the bottom section 14 are grip enhancing channels 62 and 64. These grip enhancing channels 62 and 64 are situated near the edge of the bottom section 14 in order than a human operator's finger such as 66 can gain greater purchase in gripping the case 16 during operation. Similar grip enhancing channels are provided adjacent each side of the case 16 to facilitate right-hand or left-hand gripping of the case 16.

Referring to FIG. 3, a broken away detailed view of the storage cavity 68 for the stylus means 42 is shown. The storage cavity 68 provides a plurality of channels 70 interior of the case 16 through which the stylus means 42 passes and within which the stylus 42 rests during storage. Frictional engagement between the stylus 42 and the plurality of channels 70 serves to retain the stylus 42 within the storage cavity 68 in removable frictional relation. Additional friction inducing material (not shown), such as foam rubber or the like, could be inserted intermediate various of the plurality of channels 70 in order to enhance retention force applied to the stylus 42 during storage to preclude inadvertent withdrawal of the stylus 42 from the storage cavity 68.

In FIG. 4 there is shown a side view of the invention with the scribing alignment means 24 in an operational position, with the stylus 42 stored within the storage cavity 68, illustrating support pads 72 to provide nonmarring and work surface gripping support to the case 16 during operation. Further provided in FIG. 4 is a partial section view of details regarding the attachment of the elevation adjustment means 56 to the case 16. Elevation adjustment means 58 is similarly associated with the case 16; thus only elevation adjustment means 56 will be addressed in the interest of brevity. The elevation adjustment means 56 comprises a leg support 74 with an integrally formed yoke 76. The yoke 76 pivotally retains within its bight 78 a pin 80, which pin 80 is either attached to or integrally molded with the case 16. Thus, the leg support 74 is capable of rotating about the pin 80 while retaining the pin 80 within the bight 78 of the yoke 76 to assume an upright position as shown in FIG. 4 providing an angular attitude of the case 16 with respect to a work surface 82 or, as shown in FIG. 5, the support leg 74 can be rotated to a stowed position allowing the case 16 to rest upon a work surface 82 in a substantially parallel attitude with respect to that work surface 82 and contacting the work surface 82 by support pads 72.

FIGS. 6 and 7 illustrate, respectively, the stored position of the scribing alignment means 24 and the mechanism for release of the scribing alignment means 24 from such storage. In FIGS. 6 and 7 the case 16 is shown in phantom in order to promote understanding of the scribing alignment means 24 storage with respect to its environment. In FIG. 6 the scribing alignment means 24 is stored within its cavity 58 (not shown in FIG. 6 or 7) with leg 30 engaged by latch mechanism 60. The latch mechanism 60 is comprised of a lever 84 pivotally mounted at a fulcrum point 86. The lever 84 has at one end an operating pad 88 and at the other end an engaging hook 90, which engaging hook 90 is proportioned to engage the leg 30 sufficiently to retain the scribing alignment means 24 within the cavity 58. The latch mechanism 60 further comprises a bias spring 92 mounted in a manner well known in the art in association with the latch mechanism 60 to bias the lever 84 in a position with the engaging hook 90 engaged with the leg 30 to retain the scribing alignment means 24 within the cavity 58. Application of a force "F", as shown in FIG. 7, to the operating pad 88 of the latch mechanism 60 rotates the lever 84 about the fulcrum point 86 to disengage the engaging hook 90 from the leg 30 and thereby release the scribing alignment means 24 for removal from the cavity 58. Additional biasing means (not shown) could be included within the case 16 to urge the scribing alignment means 24 outward of the cavity 58 upon release of the leg 30 by the engaging hook 90 in response to application of the force "F" to the operating pad 88.

It is to be understood that, while the detailed drawings and specific examples given describe preferred embodiments of the invention, they are for the purpose of illustration only, that the apparatus of the invention is not limited to the precise details and conditions disclosed and that various changes may be made therein without departing from the spirit of the invention which is defined by the following claims.

We claim:

1. An enclosure for an electrical data input apparatus comprising a top section and a bottom section; said top section and said bottom section being assemblable to form case means for encasing said apparatus; said top section providing an operational access to said apparatus and providing scribing guide means for cooperation with a scribing alignment means for facilitating recordation of substantially geometrically true inputs upon said apparatus; said scribing alignment means being separable from said case means; said scribing alignment means and said scribing guide means cooperating to effect orientation of said scribing alignment means in a plurality of axes with respect to said case means; said scribing alignment means being removably storable within said case means; said enclosure further comprising recordation means, said recordation means being cooperable with said scribing alignment means and said scribing guide means to record said substantially geometrically true inputs upon said apparatus; said recordation means being removably storable within said case means; said removable storage of said scribing alignment means being provided by a first cavity in said case means, said first cavity having therein latching means for retention of said scribing alignment means within said first cavity; said latching means being operable from outside said case means to effect release of said scribing alignment means from said first cavity; and said removable storage of said recordation means being provided by a second cavity in said case means, said second cavity having therein binding means for frictionally removably retaining said recordation means within said second cavity; said removable storage of said scribing alignment means and said recordation means providing a temporarily unitary assembly of said enclosure, said scribing alignment means, and said recordation means while maintaining said operational access to said apparatus unimpeded.

* * * * *